July 29, 1969  H. SEWERIN  3,458,656
APPARATUS FOR LOCALIZING WATER LEAKAGES
Filed May 31, 1966  2 Sheets-Sheet 1
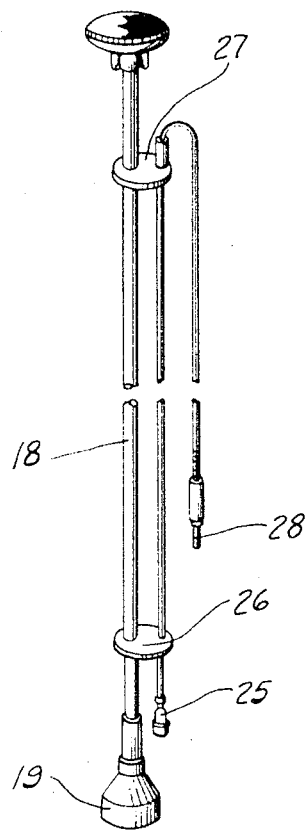
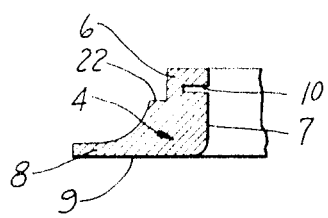
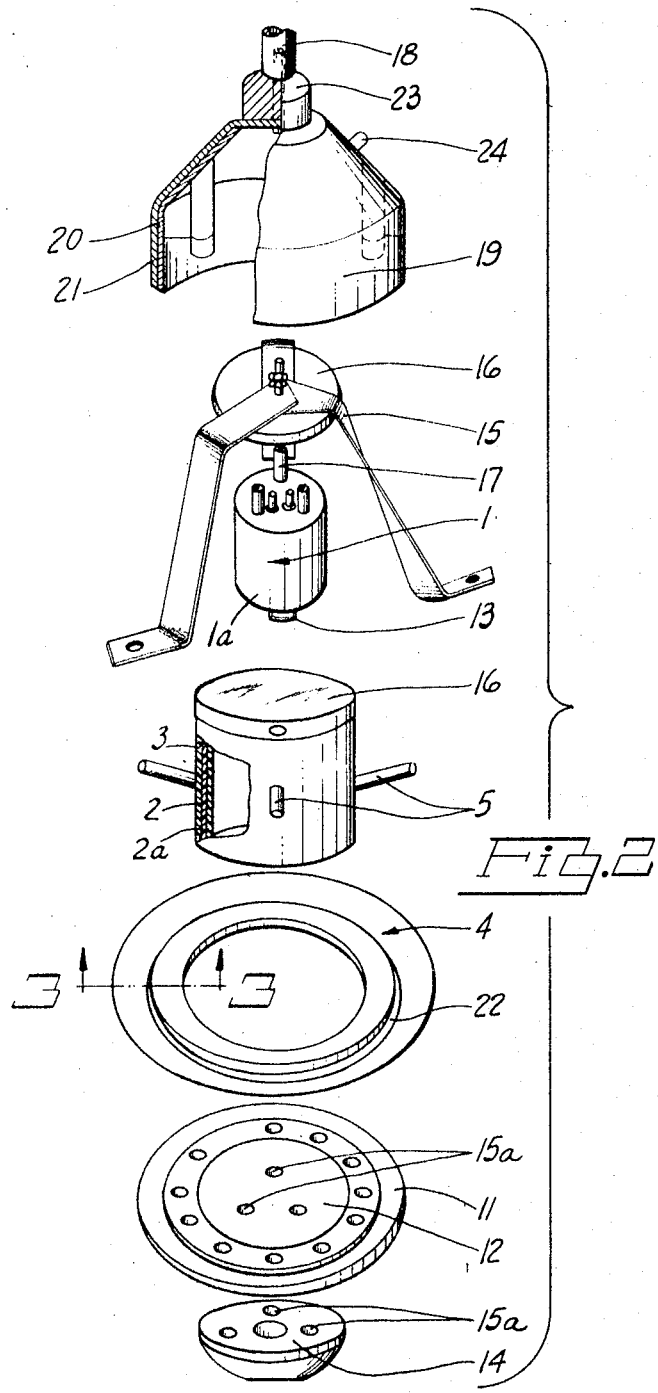
INVENTOR.
HEINRICH SEWERIN
BY Donnelly, Meutag & Harrington
ATTORNEYS

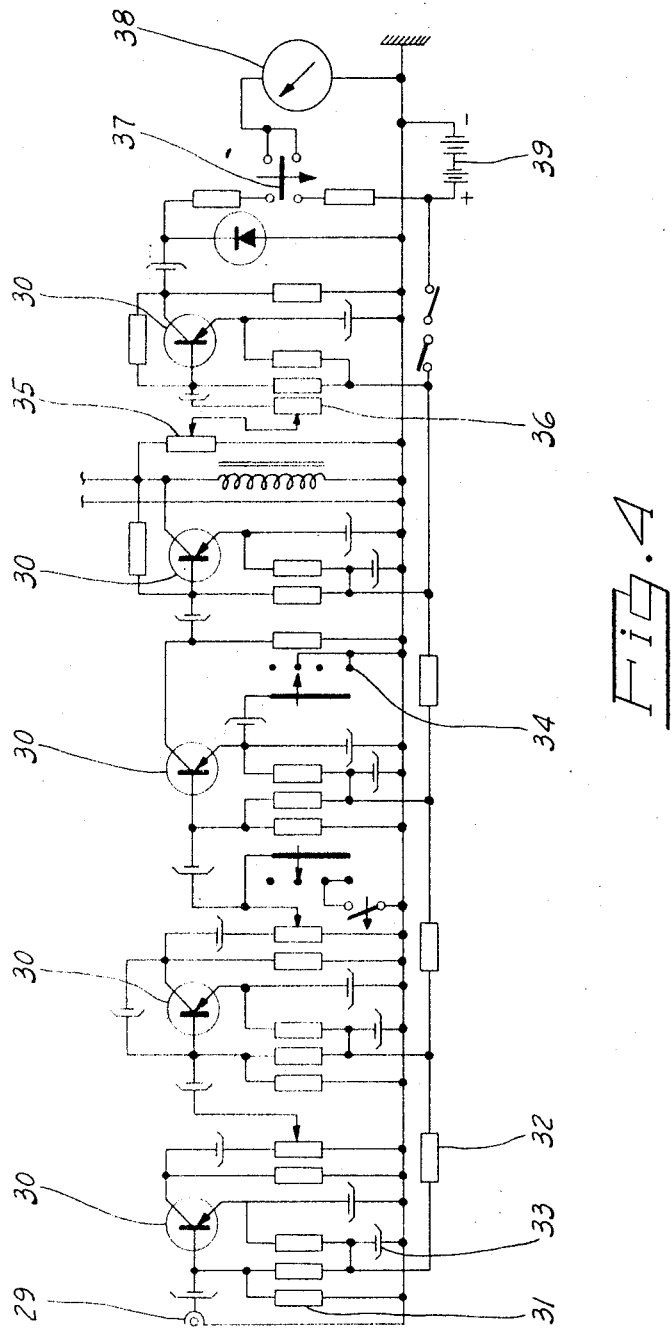

United States Patent Office

3,458,656
Patented July 29, 1969

3,458,656
APPARATUS FOR LOCALIZING WATER
LEAKAGES
Heinrich Sewerin, 2 Weidestrasse,
483 Gutersloh, Germany
Filed May 31, 1966, Ser. No. 554,150
Int. Cl. G10k *11/00;* H04m *1/04;* G01m *3/04*
U.S. Cl. 179—1                                       9 Claims

ABSTRACT OF THE DISCLOSURE

An apparatus for pin-pointing water leakages which includes a highly sensitive microphone having a frequency range of a maximum of 200 cycles per second. The microphone is mounted in a sound protective plastic encasing. The microphone is provided with a semi-spherical ground contacting surface means for sound wave transmittance.

---

The present invention relates generally to the art of detecting water leaks, and more particularly, to an apparatus for localizing underground water leakages.

In the art of localizing water leakages, acoustic orientation of flow out noises are made, and as a result of the physic properties of sound propagation there are generally used two different acoustic orientation systems. In the case of a water leakage there are generated by the high speeds at the leakage point vibrations which are propagated in particular in metal conduits and which can also be heard at the adjacent fittings. This noise transmitting the vibrations in a metal conduit, as a tube or pipe, has been designated as basic noise No. 1.

When water issues at defective points, there occur, however, two additional further basic noises. For example, a basic No. 2 noise occurs when the issuing water falls apart like a fountain and is depressurized. A No. 3 or third basic noise is generated when issuing water in the ground hits on a hindrance and there causes a respective ground resonance.

For the acoustic localization of such water defect noises (issuing noises) one must consider the properties of the propagation of the noise. In particular, the issuing noises of high frequency propagate in a metallic tube on both sides and can be rendered audible, respectively, and can be heard with suitable instruments at the fittings. The basic noises 2 and 3, however, that is, the depressurization of the water and the movement of the water molecules hitting on resistant ground, respectively, do not propagate in the tube and can be determined only in positions disposed circularly and spherically around the point of leakage. In conformity with experience, the vibration noises are in the frequency range up to a maximum of 800 cycles per second, whereas the issuing noises 2 and 3 are considerably dampened by the surrounding earth and in particular the high frequencies are filtered by the earth.

Heretofore, simple mechanical devices were used for the acoustic localization of a water defect. For example, one of these devices was a so-called manual listening box consisting of a metal linkage with a membrane box, in order to determine the vibration noises at installed fittings like slides, valves or hydrants. By this coarse or pre-localization with a sound box it was possible to restrict the noise to a definite range between two contact points, as for example between two slides. By such coarse or pre-localization it was not possible to effect a pin pointing of a leak.

In order to pin point the leakage there were used heretofore simple mechanical geophones consisting of a membrane mounted in a metal container. The membrane was additionally provided with a weight, so that the same could be vibrated with minor resonances. These geophones, provided a minor mechanical amplification by the differences in size between the membrane and the ear drum. A prerequisite was, however, that there always be a very substantial basic noise, but the geophones did not provide the possiblity to amplify this basic noise.

In the last few years there have also become known, however, elecrto-acoustic listening devices constructed according to the same principle. Thus, for example, for the pre-localization there is still used a microphone embodying the principle of the sound box. Only instead of the membrane there is used a sensitive microphone operating according to the experiences available with a frequency range of up to a maximum of 800 cycles per second because no frequencies higher than 800 cycles per second can be detected at the fittings. With this electric microphone there is effected in the former manner the pre-localization as to a range between two contact points.

For the precise pin pointing of a defect there were used so-called ground microphones or test geophones. These devices are provided with a sensitive microphone instead of the membrane. The frequency range of the microphone, however, is considerably restricted, since in view of the experiences available it was sufficient (in view of the frequency filtering by the ground) to receive vibrations with a maximum of 200 cycles per second.

The commercially available prior art ground microphones for the pin pointing of such defects are mostly arranged in a metal box or in an aluminum housing. In such housings there are also mounted the geophones. These naked housings are subject to the disadvantage that all secondary noises, as wind and traffic noises or other surrounding noises, can also directly reach the receiving surface of the microphone.

According to a further prior art embodiment of the microphones there is arranged three metal points below such box. The metal points serve for obtaining a good connection with the surface of the ground in order to obtain a good sound transmittance. The embodiment of the ground microphone with such contacting pins is even worse than the above described form of the compact metal box. According to experiences the surrounding noises can reach even better the contact surface, and in particular the wind can directly contact the receiving surface and mostly passes so strongly under the contact surface that even with minor wind these noises are so interfering that a precise pin pointing of a very weak water issuing noises is no longer possible.

In view of the foregoing it is an important object of the present invention to provide an apparatus for pin pointing water leakages which overcomes the disadvantages of the prior art water leakage locating apparatus.

It is another object of the present invention to provide an apparatus for pin pointing water leakages which comprises in contrast to the aforedescribed prior art devices a highly sensitive microphone having a frequency range of a maximum of 200 cycles per second. This microphone is mounted in a novel manner in a sound protected plastic encasing, which is sound insulated in the interior. The microphone itself does have a semi-spherical contact surface, that is, a relatively large charging surface on soft grounds. This semi-sphere has the advantage that it settles comparatively rapidly in view of its large surface, much better than, for example, a conical point which with soft grounds requires several seconds in order to settle, and which during this period naturally renders amplified audible setting noises through the transistor amplification. The microphone is freely suspended by three rubber ribbons or straps in the protected plastic space and is insulated. In order to prevent the entering of wind noises a soft rubber strand rests on the ground, and this soft rubber strand seals in a comparatively tight manner the contact surface with the receiving surface against the incoming wind, and also against incoming exterior noises.

With the commercially available prior art devices often the mounting rod or supporting rod is compactly connected with the microphone housing. In such cases very often the rod acts as a wind antenna and the passing wind is transmitted to the microphone. According to the present invention the in situ cured suspension results, however, in a sound technological separation of the linkage means from the housing, so that there can no longer occur a sound transmittance to the microphone.

The sounds received by the microphone (ground microphone or test geophone) for pin pointing a defect are passed within the frequency range to be received to a sensitive transistor amplification and there are converted into an audible and visible range.

Concerning the pre-localization it is of particular importance to use the optic indication, because optic indications can be compared much better than sound differences by the human ear. The human ear is relatively incapable of comparing sound differences over a long period, when within such period the possibility for comparison is interfered with by interfering noises, as for example, passing cars, trains and aircraft.

It is known that after the coarse localization and after the encircling two contact points of the ground microphone, every one to two steps is deposited and the occurring noises of the spherical sound propagation are optically and acoustically received.

Other objects, features and advantages of this invention will be apparent from the following detailed description, appended claims, and the accompanying drawings.

In the drawings:

FIG. 1 is a broken, perspective view of a preferred, illustrative embodiment of an apparatus made in accordance with the invention;

FIG. 2 is an exploded, perspective view, with parts broken away, and parts in section, of the lower end part of FIG. 1;

FIG. 3 is a vertical, cross section view of the structure illustrated in FIG. 2, taken along the line 3—3 thereof, and looking in the direction of the arrows; and FIG. 4 is a circuit diagram of a suitable receiver adapted to be employed in the invention.

The structure of the apparatus can be understood from the drawings, and an explanation of the mode of operation thereof follows hereafter. The novel apparatus for searching water leakages comprises a suitable highly sensitive microphone 1, known per se for such purpose, the frequency range of which is limited at the upper range to about 200 cycles per second. As stated hereinbefore, the known microphones are arranged in a metal box housing 1a in which are also mounted geophones which consist of a membrane provided with a weight. Deviating from the known art this microphone 1 is mounted in a novel manner in a sound protecting plastic encasing 2.

The encasing 2 is suitably lined on its interior wall with a sound protective coating 2a. It is further advantageous to provide this plastic casing 2 also on its exterior surface with an anti-drone coating 3. The plastic container 2 is surrounded in its lower portion of exterior wall by a profile rubber ring 4. In order to ensure a good seat of this ring 4 on the microphone container 2, such container 2 is provided with a plurality of suitable, downwardly directed or inclined rod type arms 5. These arms 5 are supported on the surface 6 of the ring 4. The good and safe seating of the ring 4 is obtained by an abutment edge or internal surface 7 extending vertically parallel to the main axis of the container 2. The ring 4 is provided with a lip 8 along its lower end which extends radially outward. The lip 8 provides the ring 4 with the broad lower surface 9, and thus the apparatus rests on the surface of the ground for searching for water leakages.

In order that secondary noises from the air or from the earth are avoided from propagation into the apparatus when working close to roads, the ring 4 consists of natural or synthetic rubber. It is further advantageous to provide within the ring 4 an additional transverse, circular slot 10 which protrudes horizontally from the abutting surface 7 into the ring 4. In this manner the mechnical transmittance of vibrations from the ring 4 into the arms 5 and thus to the container 2 is additionally avoided.

The bottom of the container 2 is closed by means of the disc 11 containing the membrane 12, against which abuts the key 13 of the microphone 1. At the membrane 12 there is secured in novel manner a semisphere 14 as a contact surface member, by any suitable means, as by the securing bolts 15a.

The microphone housing 2 is suspended by means of the arms 5 which are suitably carried by the three rubber ribbons or straps 15. The passage 17 of the microphone 1 is secured into the cover 16 and is also protected by the sound absorbing encasing 2. The microphone 1 with its key 13 in the container 2, 3, 5, and the rubber disc 4, and the contact means 11, 12, 14 is mounted in a housing 19 with a sound absorbing lining 20 in such a manner that the lower edge 21 of the housing 19 is sealingly seated on the ledge 22 of the ring 4. The securing rod 18 under insertion of a sound dampening sleeve 23 protrudes from the apex of the housing 19. The electric connection 24 is provided for obtaining a connection with a transistor amplifier (not shown) at the line rod 25. As shown in FIG. 1, this line rod 25, by means of the passage and securing discs 26 and 27 is sound absorbing insulated in respect to the carrying rod 18. The connection 28 serves for the transfer of the microphone signals to a highly sensitive transistor amplifier, and thence to a search receiver. The search receiver (not shown) is a low frequency amplifier with circuit arrangement according to FIG. 4, and it operates with transistors. The plug 28 (FIG. 1) serves for a connection at the inlet socket 29 (FIG. 4) of the receiver circuit.

The receiver circuit comprises three inlet groups with transistors 30, resistors 31, 32 and capacitors 33. Through the step switches 34 there are connected two outlet groups comprising in similar manner transistors, resistors and capacitors. There are further provided trimmers 35 in the form of potentiometers 36. The contact key 37 serves for switching on the measuring instrument 38 under co-operation of the battery 39.

It is thus seen that the receiver is constructed according to the kit principle. By using transistors 30 there is achieved no current consumption. There is not needed an anode battery. The battery 39 can be easily exchanged. The state of charge of the battery 39 can be easily examined by actuating the contact switch 37. Then the measuring instrument 38 indicates in percent the fully operative voltage. The socket of the inlet contact is laterally protected, so that testing rods, test geophones, searching coils etc. can be easily connected, and by means of the search receiver the remaining acoustic indication in the ear phone is improved by means of the optical indication in the measuring device 38.

It is a general experience that different instrument indications can be much better determined and compared than lower tone differences.

This advantage is particularly pronounced when searching for a leakage under difficult conditions.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In an apparatus for pin pointing water leakages, the combination comprising:

(a) a highly sensitive microphone operated in a frequency range of up to 200 cycles per second;
(b) said microphone being mounted in a metal box and provided with a weight for amplifying vibrations of low resonance;
(c) said microphone being provided with linkage means for transmitting ground vibrations; and,
(d) characterized in that the microphone (1) is mounted in a sound protected plastic encasing (2) lined on its interior wall with a sound protective coating, and provided on its exterior surface with an anti-drone coating (3).

2. An apparatus for pin pointing water leakages as defined in claim 1, wherein:
(a) the lower portion of the exterior wall of the encasing (2) is surrounded by profile rubber ring (4), the good fitting of which is ensured by rod type arms (5) inclined in downward direction and mounted at the encasing (2); and,
(b) there further being provided an edge (7) extending vertically to the main axis of the encasing (2).

3. An apparatus for pin pointing water leakages as defined in claim 2, wherein:
(a) the ring (4) consists of natural rubber.

4. An apparatus for pin pointing water leakages as defined in claim 2, wherein:
(a) the ring (4) consists of synthetic rubber.

5. An apparatus for pin pointing water leakages as defined in claim 2, wherein:
(a) the ring (4) is provided with a transverse slot (10) extending from the edge (7) into the ring (4).

6. An apparatus for pin pointing water leakages as defined in claim 1, wherein:
(a) said microphone includes a membrane (12); and,
(b) a semi-sphere (14) is mounted on the membrane (12) and serves as a contact surface means for the sound wave transmittance.

7. An apparatus for pin pointing water leakages as defined in claim 1, wherein:
(a) the encasing (2) is suspended by a plurality of arms (5) carried by a plurality of rubber ribbons (15);
(b) the microphone (1) includes contact means (11, 12, 14); and,
(c) the microphone (1), the rubber ring (4) and the contact means (11, 12, 14) are mounted in a housing (19) provided with sound absorbing lining (20) in such a manner that the lower housing edge (21) sealingly rests on an edge (22) of the ring (4).

8. An apparatus for pin pointing water leakages as defined in claim 1, including:
(a) a highly sensitive transistor amplifier means for effecting an amplification of the sound vibrations received by said microphone (1).

9. An apparatus for pin pointing water leakages as defined in claim 8, including:
(a) electronic means for rendering said vibrations visible for comparative purposes.

References Cited

UNITED STATES PATENTS

| | | |
|---|---|---|
| 1,830,237 | 11/1931 | Morse. |
| 2,235,518 | 3/1941 | Goshaw. |
| 2,755,336 | 7/1956 | Zener et al. |
| 2,755,880 | 7/1956 | Hofmann. |
| 2,900,039 | 8/1959 | Burnett. |
| 3,223,194 | 12/1965 | Michael. |
| 3,264,864 | 8/1966 | Reid et al. _____ 73—40.5 X |

KATHLEEN H. CLAFFY, Primary Examiner

VAN C. WILKS, Assistant Examiner

U.S. Cl. X.R.

73—40.5; 179—146; 181—.5